United States Patent [19]

Livingston et al.

[11] Patent Number: 5,426,264
[45] Date of Patent: Jun. 20, 1995

[54] CROSS-LINKED POLYETHYLENE CABLE INSULATION

[75] Inventors: David W. Livingston, Claremore; David H. Neuroth, Tulsa, both of Okla.; David G. Korte, Siloam Springs, Ark.

[73] Assignee: Baker Hughes Incorporated, Houston, Tex.

[21] Appl. No.: 183,002

[22] Filed: Jan. 18, 1994

[51] Int. Cl.⁶ .............................................. H01B 7/18
[52] U.S. Cl. .......................... 174/102 R; 174/110 FC; 174/110 PM; 174/113 R; 174/120 R; 264/174
[58] Field of Search ......... 174/102 R, 110 FC, 117 F, 174/113 R, 120 R, 120 AR, 120 SR, 110 PM; 264/174

[56] References Cited

U.S. PATENT DOCUMENTS

| | | | |
|---|---|---|---|
| 2,851,515 | 9/1958 | Kolmorgen et al. | 174/117 F |
| 3,269,862 | 8/1966 | Lanza et al. | 174/120 R |
| 3,413,408 | 11/1968 | Robinson | 174/121 R |
| 3,484,540 | 12/1969 | Wilson et al. | 174/120 R |
| 3,569,610 | 3/1971 | Garner et al. | 174/107 |
| 3,719,769 | 3/1973 | Miyauchi et al. | 174/120 SC |
| 3,876,462 | 4/1975 | Carini et al. | 174/120 SC |
| 4,042,776 | 8/1977 | Matsuba et al. | 174/110 R |
| 4,069,190 | 1/1978 | Vostovich | 260/31.8 M |
| 4,091,291 | 5/1978 | Foster et al. | 307/95 |
| 4,096,351 | 6/1978 | Wargin et al. | 174/102 R |
| 4,184,001 | 1/1980 | Hildreth | 174/120 SR |
| 4,259,281 | 3/1981 | Lanfranconi et al. | 174/110 PM |
| 4,276,251 | 6/1981 | Bopp | 174/110 PM |
| 4,284,841 | 8/1981 | Tjunelis et al. | 174/102 R |
| 4,351,790 | 9/1982 | Hochstrasser et al. | 264/174 |
| 4,430,472 | 2/1984 | Guzy | 524/483 |
| 4,472,598 | 9/1984 | Boyd et al. | 174/113 R |
| 4,490,577 | 12/1984 | Neuroth | 174/117 F |
| 4,492,523 | 1/1985 | Knox | 417/13 |
| 4,520,230 | 5/1985 | Uesugi et al. | 174/107 |
| 4,521,485 | 6/1985 | Tondre et al. | 428/383 |
| 4,588,855 | 5/1986 | Kutsuwa et al. | 174/120 SC |
| 4,600,805 | 7/1986 | Gynn et al. | 174/102 R |
| 4,658,089 | 4/1987 | Guzy et al. | 174/113 R |
| 4,675,474 | 6/1987 | Neuroth | 174/102 R |
| 4,801,766 | 1/1989 | Aida et al. | 174/120 SC |
| 4,804,729 | 2/1989 | Orikasa et al. | 174/110 PM |
| 4,820,764 | 4/1989 | Guzy et al. | 524/512 |
| 4,894,284 | 1/1990 | Yamanouchi et al. | 428/378 |
| 4,948,641 | 8/1990 | Sheetz et al. | 428/35.7 |
| 5,068,497 | 11/1991 | Krieger | 174/106 R |
| 5,086,196 | 2/1992 | Brookbank et al. | 174/102 R |
| 5,281,766 | 1/1994 | Hildreth | 174/120 R |

*Primary Examiner*—Morris H. Nimmo
*Attorney, Agent, or Firm*—Felsman, Bradley, Gunter & Dillon

[57] ABSTRACT

An electrical cable for use in submersible well pumps in oil and gas well environments is provided having an electrical conductor core which is surrounded by an insulating layer of cross-linked polyethylene. A barrier layer surrounds the cross-linked polyethylene insulating layer. The barrier layer is impermeable to oil and other liquid hydrocarbons, but is permeable to low molecular gases. The barrier layer is preferably formed from a fluoropolymer and is surrounded by a polymeric protective layer. An adhesive layer attaches the barrier layer to the insulating layer.

25 Claims, 1 Drawing Sheet

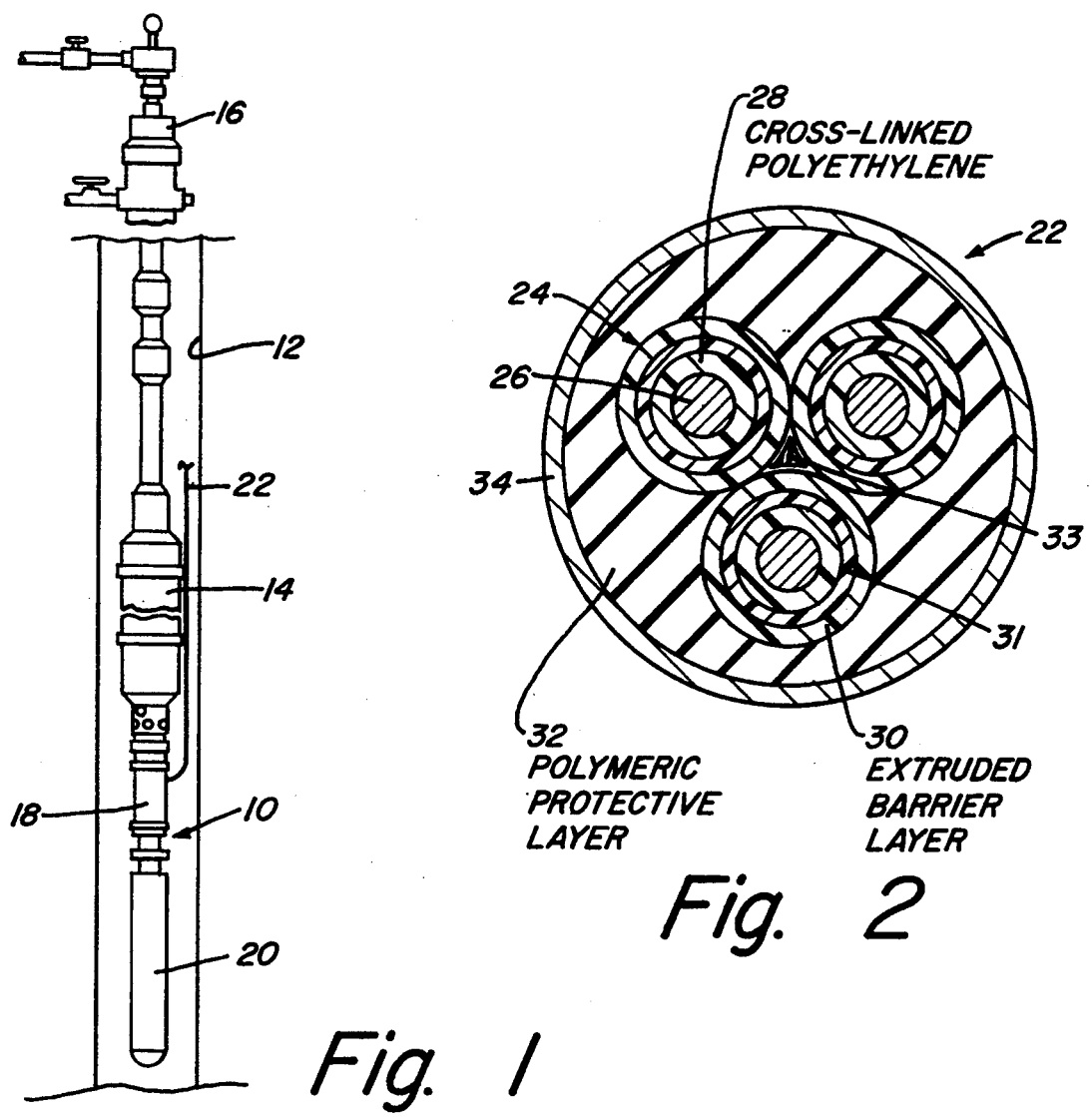
Fig. 1
Fig. 2
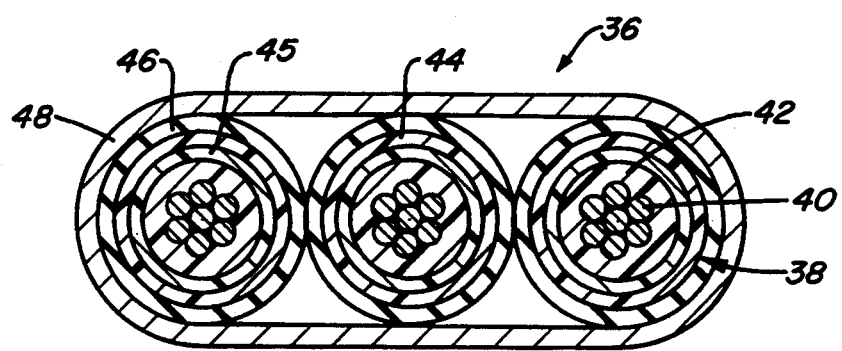
Fig. 3

CROSS-LINKED POLYETHYLENE CABLE INSULATION

BACKGROUND OF THE INVENTION

1. Field of the Invention

This invention relates in general to electrical cable, and in particular to electrical cable for use with submersible pumps in oil and gas wells.

2. Description of the Prior Art

Cross-linked polyethylene has been used for many years as an insulator for electrical conductors. The cross-linked polyethylene provides a very stable insulator which is fairly inexpensive and is resistant to deterioration when subjected to elevated temperatures. Cross-linked polyethylene, however, has not been used extensively in submersible well pump applications because of its tendency to degrade when subjected to oil and other liquid hydrocarbons which are commonly found in oil and gas wells.

In the past, electrical cables used for submersible well pumps have primarily been constructed with polypropylene or EPDM (ethylene-propylene diene monomer) insulation. Polypropylene is readily available, has good dielectric properties and is fairly inexpensive, however, polypropylene is subject to deterioration when subjected to the high temperatures found in some oil and gas well environments. Normally, the maximum temperature polypropylene is able to withstand is about 205 degrees Fahrenheit. This restricts the use of polypropylene as an insulating material for electrical submersible pump cables to low temperature wells. EPDM insulation, on the other hand, does not deteriorate when subjected to high temperatures, even up to 400 degrees Fahrenheit. The EPDM insulation, however, is prone to swelling with exposure to hydrocarbon well fluids and is relatively expensive. During extrusion, EPDM is normally cured in a steam tube which is a fairly slow process.

It would be beneficial to have an electrical cable insulation for a submersible well pump which is stable under higher temperatures than polypropylene, will not swell or deteriorate when subjected to exposure to well fluids such as oil and other liquid hydrocarbons, and is less expensive than EPDM.

SUMMARY OF THE INVENTION

An electrical cable insulation is provided for a submersible pump used in oil and gas wells which is stable at moderately high temperatures, does not swell or deteriorate when subjected to well fluids, and is relatively inexpensive. The electrical cable is formed from insulated conductors which have an electrical conductor core and an insulating layer of cross-linked polyethylene which is extruded over the conductor core. A barrier layer, such as a fluoropolymer, is extruded over and surrounds the insulating layer of cross-linked polyethylene. The barrier layer is impermeable to oil and other liquid hydrocarbons but is permeable to low molecular weight gases. A polymeric protective layer is used to surround the barrier layer of the conductors. Metal armor is then wrapped around the conductors.

BRIEF DESCRIPTION OF THE DRAWINGS

FIG. 1 is a cross-sectional side view of an oil well with a submersible pump.

FIG. 2 is a cross-sectional view of an electrical cable constructed in accordance with the invention for the submersible pump of FIG. 1.

FIG. 3 a cross-sectional view of another embodiment of the electrical cable constructed in accordance with the invention for the submersible pump of FIG. 1.

DETAILED DESCRIPTION OF THE INVENTION

Referring to FIG. 1, an electrical submersible pump 10 is shown located in a well 12. The pump 10 includes a centrifugal pump 14 with an intake 15 for conducting well fluids to a well head 16 located at the surface. The pump 10 has a seal section 18 connected below the centrifugal pump 14. An electrical motor 20 is connected to the seal section 18. The seal prevents well fluid from seeping into the motor 20.

An electrical cable 22 provides electrical power to the motor 20. The electrical cable 22, as shown in FIG. 2, is provided with three insulated conductors 24. The electrical cable 22 has a circular cross section in the embodiment of FIG. 2. Each conductor 24 has a conductor core 26 of copper or other suitable electroconductive material. A layer of cross-linked polyethylene (XLPE) insulation 28 surrounds the copper conductor core 26. The cross-linked polyethylene insulating layer 28 is a thermosetting material typically 0.050 to 0.100 inches in thickness. Preferably, a water curable cross-linked polyethylene is used as the insulating layer 28, however, steam or radiation cured cross-linked polyethylene could also be used for the insulating layer 28. An example of such a water curable cross-linked polyethylene is sold under the trademark "Si-Link" polyethylene available from Union Carbide, Polyolefins Div., 39 Old Ridgebury Road, Danbury, Conn. 06817-2450.

Surrounding the insulation layer 28 is a thin barrier layer 30. The barrier layer 30 has a thickness of typically 0.002 to 0.015 inches. The barrier layer 30 is a thermoplastic material which is impermeable to oil and other liquid hydrocarbons. The barrier layer 30 is, however, permeable to low molecular weight hydrocarbon gases, water vapor and carbon dioxide. The overall permeability of the thin barrier layer 30 is equal or greater than the permeability of the thicker insulating layer 28 so that gases which permeate the insulating layer 28 are not trapped beneath the barrier layer 30 when the cable 22 is decompressed. The barrier layer 30 is formed from a fluoropolymer, which is extruded around the insulation layer 28 of cross-linked polyethylene. Preferably, an extruded polyvinylidine fluoride (PVDF) is used as the barrier layer 30. Other fluoropolymers may be used for the barrier layer 30, however, and include polyvinylfluoride (PVF), fluorinated ethylene propylene (FEP), polytetrafluoroethylene (PTFE), perfluoroalkoxy (PFA) resin and tetrafluoroethylene. Non-fluoropolymers may also be used as the barrier layer 30 and include such materials as polyamides, polyesters, polyetheramides, and polyphenylene sulfide.

Because most fluoropolymers will not chemically bond to the cross-linked polyethylene insulating material, an adhesive 31 may be used to adhesively tie the barrier layer 30 and the insulating layer 28 together. The adhesive 31 is approximately 0.001 inches in thickness. The adhesive 31 prevents gases from forming gas pockets between the insulating layer 28 and the barrier layer 30 when the electrical cable 22 is being pulled from the well. Without the adhesive layer 31, gas pockets could rupture the barrier layer 30 when the electrical cable 22 is rapidly depressurized. An appropriate adhesive is ethylene-vinyl acetate copolymer resin such as that sold under the trademark "Elvax 46" and "Elvax 46L" by Du Pont de Nemours, E.I., and Co., Wilmington, Del., which has a vinyl acetate content of 46 percent. This adhesive 31 ties the outer surface of the insulating layer 28 to the inner surface of the barrier layer 30 so that there are no spaces or voids between the insulating layer 28 and the barrier layer 30.

In the embodiment of FIG. 2, a polymeric protective layer 32 surrounds the conductors 24 around each of the barrier layers 30. The protective layer 32 can be any type of rubber, such as nitrile rubber, plastic or thermoplastic elastomer which is suitable for downhole applications. The protective layer 32 may be an extruded layer, as shown in the embodiment of FIG. 2, or a layer of helically wrapped tape (not shown). The protective layer 32 is permeable to low molecular weight gases and is resistant to attack or deterioration by chemical agents, such as salt, acids, gases and hydrocarbons, which may be present in the well 12. As shown in the embodiment of FIG. 2, the conductors 24 are embedded within the extruded protective layer 32 in a pattern with the centers of the conductors 24 being spaced 120 degrees apart from each other. A rubber string 33 is positioned in the center between the conductors 24.

An outer metal armor 34 surrounds the protective layer 32. The armor 34 is comprised of metal strips that are helically wrapped around the exterior of the protective layer 32. The metal armor 34 provides protection against mechanical abrasion and damage to the electrical cable 22 during use.

The construction of the electrical cable 22 is as follows. Lengths of copper wire are initially provided having circular cross sections. The copper wire forms the conductor core 26 and is continuously passed through a first extruder where a layer of water curable cross-linked polyethylene is extruded around the copper wire or core 26 to form the insulating material 28. At this stage the polyethylene is not cross-linked and is at an elevated temperature.

Prior to curing, while still at an elevated temperature, the conductor core 26 with the insulating layer 28 is then passed through a second, dual-head extruder where the adhesive layer 31 and the thermoplastic barrier layer 30 are co-extruded around the insulating layer 28 and passed through a trough of water to cool. This forms the insulated conductor 24 with the adhesive layer 31 tying the insulating layer 28 and the barrier layer 30 together. Because the barrier layer 30 is a thermoplastic material, the cooling step hardens the extruded barrier layer 30. There is no cross-linking or curing of the barrier layer 30. The uncured polyethylene insulating layer 28 of the conductors 24 is then allowed to cure or cross-link by placing the conductors 24 in a steam sauna for several hours. Because the barrier layer 30 is permeable to water vapor, the water vapor passes through the barrier layer 30 and diffuses into the uncured polyethylene of the insulating layer 28 causing the polyethylene to cross-link.

After the insulating layer 28 has cured, the three insulated conductors 24 are arranged in the triangular configuration of FIG. 2 with the rubber string 33 located between the conductors 24. An elastomeric material is extruded and cured around the three conductors 24 to form the protective layer 32. A continuous strip of metal is then helically wrapped around the exterior of the protective layer 32 to form the metal armor 34. The protective layer 32 protects the conductors 24 from mechanical damage from the metal armor 34.

The pressure of the gases in the production fluid of most oil and gas wells is very high due to the great height of the production fluid column. When the electrical cable 22 is lowered into a well, the high pressure forces gases from the production fluid through gaps or holes in the armor 34. These gases eventually permeate and pass through the protective layer 32. Low molecular weight gases, such as methane, which pass through the protective layer 32 eventually pass through the barrier layer 30 and permeate the cross-linked insulation layer 28 until the pressure of the gases in the intermolecular spaces of the cross-linked polyethylene insulation and the pressure of the gases in the well fluid reach equilibrium.

The cross-linked polyethylene layer of insulation 28 remains stable and does not deteriorate at temperatures up to 250 degrees Fahrenheit, in excess of the maximum temperature for polypropylene. Therefore the cross-linked polyethylene provides a good insulator for the conductors 26 in moderately high temperature wells. However, because cross-linked polyethylene degrades when exposed to oil and other liquid hydrocarbons, it is important that the cross-linked insulating layer 28 is not subjected to such exposure. The fluoropolymer barrier layer 30 protects the insulating layer 28 and prevents any oil or other liquid hydrocarbons from penetrating the cross-linked polyethylene insulating layer 28.

When the electrical cable 22 is depressurized, the low molecular weight gases in the insulating layer 28 expand. Because the barrier layer 30 is permeable to the low molecular weight gases, the gases are allowed to diffuse and pass through the barrier layer 30 without damaging the insulation 28. The attachment of the barrier layer 30 to the insulating layer 28 prevents the formation of gas pockets between the barrier layer 30 and insulating layer 28. It should be noted that an optional braid layer (not shown) could be placed around the exterior of the barrier layer 30 of each of the conductors 24 to contain any decompression induced expansion of the barrier layer 30 or insulating layer 28.

Another embodiment of the electrical cable is shown in FIG. 3. The electrical cable 36 has a substantially flat cross section and consists of three insulated conductors 38 which are laterally disposed. Each conductor core 38 may include a plurality of copper wires or strands 40, as shown in FIG. 3, which together comprise an electrical conductor core or may be a solid conductor core. Extruded around the copper strands 40 is a cross-linked polyethylene insulation layer 42. A fluoropolymer barrier layer 44 surrounds the cross-linked polyethylene insulating layer 42 of each conductor 38. An adhesive layer 45 attaches the barrier layer 44 to the insulation layer 42. A protective layer 46 is extruded or wrapped around each of the conductors 38. Metal armor 48 surrounds the protective layer 46. The protective layer 46 protects the barrier layer 44 from mechanical damage which could otherwise result from contact with the metal armor 48. Additionally, a tape or braid layer could be placed around the barrier layer 44 or protective layer 46 to prevent decompression expansion.

The electrical cable of the invention is an improvement over the prior art electrical cables for submersible well pumps. The extruded layer of fluoropolymer surrounding the insulating layer prevents oil and other liquid hydrocarbons from penetrating the insulating layer. This allows cross-linked polyethylene insulation to be used which would otherwise deteriorate with exposure to oil and other well fluids. The cross-linked polyethylene is stable at moderately high temperatures and is fairly inexpensive compared to EPDM insulation used in prior art electrical submersible pump cables. The water curable cross-linked polyethylene can be processed more quickly than EPDM, which is conventionally cured in a steam tube at a much slower rate. There is no need to provide a curing step immediately after extruding the insulating layer. Because the barrier layer is permeable to water vapor, the polyethylene forming the insulating layer can be cross-linked after extrusion of the barrier layer. Use of the adhesive layer to join the insulating layer to the barrier layer prevents gas pockets from building up between the insulating layer and the barrier layer which could otherwise rupture the barrier layer when the electrical cable is depressurized.

While the invention has been shown in only one of its forms, it should be apparent to those skilled in the art that it is not so limited, but is susceptible to various changes without departing from the scope of the invention.

We claim:

1. An electrical cable for a submersible well pump used in oil and gas wells, the electrical cable comprising in combination:
   at least three conductors, each conductor comprising:
      an electrical conductor core;
      an insulating layer comprised of cross-linked polyethylene surrounding the conductor core; and
      a thermoplastic barrier layer extruded around the insulating layer which is impermeable to oil and liquid hydrocarbons and permeable to low molecular weight gases; and
   a protective layer surrounding the conductors.

2. The electrical cable of claim 1, wherein:
   the protective layer is a polymeric protective layer; and further comprising
   an outer metal armor surrounding the protective layer.

3. The electrical cable of claim 1, wherein:
   the insulating layer is a water cured cross-linked polyethylene.

4. The electrical cable of claim 1, wherein:
   the barrier layer is a fluoropolymer.

5. The electrical cable of claim 1, wherein:
   the barrier layer is a fluoropolymer selected from a group consisting of polyvinylfluoride, fluorinated ethylene propylene, polytetrafluoroethylene, perfluoroalkoxy resin, polyvinylidene fluoride and tetrafluoroethylene.

6. The electrical cable of claim 1, wherein:
   the barrier layer is selected from a group consisting of polyamide, polyester, polyetheramide and polyphenylene sulfide.

7. The electrical cable of claim 1, wherein:
   the insulating layer is substantially greater in thickness than the barrier layer.

8. The electrical cable of claim 1, wherein:
   the barrier layer has a thickness ranging from about 0.002 inches to 0.015 inches; and
   the insulating layer has a thickness ranging from about 0.050 inches to 0.100 inches.

9. The electrical cable of claim 1, wherein:
   the barrier layer is adhesively joined to the insulating layer.

10. An electrical cable for a submersible well pump used in oil and gas wells, the electrical cable comprising in combination:
    at least three conductors, each conductor comprising:
       an electrical conductor core;
       an insulating layer consisting essentially of cross-linked polyethylene surrounding the conductor core;
       a barrier layer of extruded fluoropolymer surrounding the insulating layer which is impermeable to oil and liquid hydrocarbons and permeable to low molecular weight gases;
    a polymeric protective layer surrounding the conductors; and
    an outer metal armor surrounding the protective layer.

11. The electrical cable of claim 10, wherein:
    the barrier layer is a fluoropolymer selected from a group consisting of polyvinylfluoride, fluorinated ethylene propylene, polytetrafluoroethylene, perfluoroalkoxy resin, polyvinylidene fluoride and tetrafluoroethylene.

12. The electrical cable of claim 10, wherein:
    the insulating layer is substantially greater in thickness than the barrier layer.

13. The electrical cable of claim 10, wherein:
    the barrier layer has a thickness ranging from about 0.002 inches to 0.015 inches; and
    the insulating layer has a thickness ranging from about 0.050 inches to 0.100 inches.

14. The electrical cable of claim 10, wherein:
    the barrier layer is adhesively joined to the insulating layer.

15. A method of forming an electrical cable for a submersible well pump used in oil and gas wells, the method comprising in combination:
    providing an electrical conductor core;
    extruding an insulating layer of cross-linked polyethylene around the electrical conductor core; and
    extruding a thermoplastic barrier layer, which is impermeable to oil and liquid hydrocarbons and permeable to low molecular weight gases, around the insulating layer.

16. The method of claim 15, wherein:
    the step of extruding an insulating layer of cross-linked polyethylene around the electrical conductor core includes water curing the cross-linked polyethylene; and
    the step of extruding a barrier layer around the insulating layer includes extruding a fluoropolymer around the insulating layer.

17. The method of claim 15, further comprising the steps of:
    surrounding the barrier layer with an extruded, polymeric protective layer; and
    surrounding the protective layer with an outer metal armor.

18. The method of claim 15, further comprising:
    adhesively attaching the barrier layer to the insulating layer while extruding the barrier layer around the insulating layer.

19. The method of claim 15, further comprising:
    adhesively attaching the barrier layer to the insulating layer while extruding the barrier layer around the insulating layer by extruding an adhesive layer between the insulating layer and the barrier layer.

20. The method of claim 15, further comprising:

adhesively attaching the barrier layer to the insulating layer while extruding the barrier layer around the insulating layer by extruding an adhesive layer between the insulating layer and the barrier layer; and then passing the cable with the extruded insulating, adhesive and barrier layer through a trough of water to cool.

21. An electrical cable for a submersible well pump used in oil and gas wells, the electrical cable comprising in combination:

an electrical conductor core;

an insulating layer comprised of water cured cross-linked polyethylene surrounding the conductor core; and a thermoplastic barrier layer surrounding the insulating layer which is impermeable to oil and liquid hydrocarbons and permeable to low molecular weight gases.

22. An electrical cable for a submersible well pump used in oil and gas wells, the electrical cable comprising in combination:

an electrical conductor core;

an insulating layer comprised of cross-linked polyethylene surrounding the conductor core; and a thermoplastic barrier layer of an extruded fluoropolymer surrounding the insulating layer which is impermeable to oil and liquid hydrocarbons and permeable to low molecular weight gases.

23. An electrical cable for a submersible well pump used in oil and gas wells, the electrical cable comprising in combination:

an electrical conductor core;

an insulating layer comprised of cross-linked polyethylene surrounding the conductor core; and a thermoplastic barrier layer selected from a group consisting of polyamide, polyester, polyetheramide and polyphenylene sulfide surrounding the insulating layer which is impermeable to oil and liquid hydrocarbons and permeable to low molecular weight gases.

24. An electrical cable for a submersible well pump used in oil and gas wells, the electrical cable comprising in combination:

an electrical conductor core;

an insulating layer comprised of cross-linked polyethylene surrounding the conductor core; and a thermoplastic barrier layer surrounding the insulating layer which is impermeable to oil and liquid hydrocarbons and permeable to low molecular weight gases, the barrier layer being adhesively joined to the insulating layer.

25. An electrical cable for a submersible well pump used in oil and gas wells, the electrical cable comprising in combination:

an electrical conductor core;

an insulating layer consisting essentially of a water cured cross-linked polyethylene surrounding the conductor core;

a barrier layer of extruded fluoropolymer surrounding the insulating layer which is impermeable to oil and liquid hydrocarbons and permeable to low molecular weight gases; and an outer metal armor surrounding the barrier layer.

* * * * *